US007707102B2

(12) United States Patent
Rothstein

(10) Patent No.: US 7,707,102 B2
(45) Date of Patent: Apr. 27, 2010

(54) METHOD AND APPARATUS FOR MONITORING THE COLLATERAL RISK ANALYSIS COMMODITY LENDERS

(76) Inventor: Robert E. Rothstein, P.O. Box 15309, Seattle, WA (US) 98115-0309

( * ) Notice: Subject to any disclaimer, the term of this patent is extended or adjusted under 35 U.S.C. 154(b) by 1369 days.

(21) Appl. No.: 10/973,951

(22) Filed: Oct. 25, 2004

(65) Prior Publication Data

US 2005/0149433 A1 Jul. 7, 2005

Related U.S. Application Data

(60) Provisional application No. 60/513,661, filed on Oct. 23, 2003.

(51) Int. Cl.
*G06F 17/10* (2006.01)
(52) U.S. Cl. .......................................... 705/38; 705/10
(58) Field of Classification Search ...................... 705/4, 705/10, 38
See application file for complete search history.

(56) References Cited

U.S. PATENT DOCUMENTS 5,636,117 A * 6/1997 Rothstein ........................ 705/4

6,058,369 A * 5/2000 Rothstein ..................... 705/10
2004/0153330 A1* 8/2004 Miller et al. .................... 705/1

OTHER PUBLICATIONS

Weiner, Stuart E., Why are so few financial assets indexed to inflation?, Economic Review, pp. 3-18, May 1983.*
O'Toole, Janet, Appraisal Procedures and Real Estate Lending, The Appraisal Journal, Jan. 1989, pp. 23-30.*
Weirick, William & Ingram, Jerry, Functional Form Choice in Applied Real Estate Analysis, The Appraisal Journal, Jan. 1990, pp. 57-73.*

* cited by examiner

*Primary Examiner*—Hani Kazimi
*Assistant Examiner*—Carol See
(74) *Attorney, Agent, or Firm*—Christensen O'Connor Johnson Kindness

(57) ABSTRACT

The risk of loss in individual collateral loans may be evaluated by taking into consideration the market supply and demand for the collateral/asset, as well as the amount of the loan balance in proportion to the value of the collateral. A Collateral Risk Index is determined using information regarding the total number of sales of the collateral/asset, the total number of pending listings, the total number of active listings, and the total number of expired listings in a time period. This information is used in conjunction with the loan balance versus the collateral/asset value to determine an index reflective of the risk of loss to the lender or investor.

13 Claims, 3 Drawing Sheets

//METHOD AND APPARATUS FOR MONITORING THE COLLATERAL RISK ANALYSIS COMMODITY LENDERS

CROSS-REFERENCE TO RELATED APPLICATION

This application claims the benefit of U.S. Provisional Application No. 60/513,661, filed Oct. 23, 2003.

FIELD OF THE INVENTION

This invention is directed towards risk management analysis and, more particularly, to a method for determining the risk to lenders of individual commodity or asset loans.

BACKGROUND OF THE INVENTION

The market in the United States and other countries for commodities/assets, such as real estate, watercraft, aircraft, automobiles, and high dollar leased equipment, such as medical and manufacturing equipment, can be volatile and uncertain due in part to effects from many external factors. For example, the strength of the national, regional, or local economies, seasonal fluctuations, inflation, interest rates, and other factors all influence the direction of the market for high dollar assets. Further, the real estate, boat, auto, and airplane building and other related businesses are important to the welfare of the public, with several million jobs directly related to these industries. These include, for example, sales agents, construction workers, machinists, bankers, architects, designers, engineers, and developers, all of whom rely upon the open market for these commodities for their livelihood. For many much of the rest of the population, purchases of these commodities are large investments and are critical to the ability to intersect with the rest of the economy for a livelihood.

Given the extent of investment in loans against these high dollar assets by the country's financial sector, it would be financially prudent to evaluate the collateral risk of such loans on an individual basis. This will allow the lender to identify those loans of higher risk and take action to reduce the likelihood of losses occurring from these risks. Or, once a loan later discovered to pose high-risk has made its way into a lender's or investor's portfolio, early identification becomes critical to the profitability of the whole portfolio. Such action could include, for example, more closely monitoring these loans for slow payment and other signs that a default might occur. Alternatively, such loans may be pooled, discounted, and then sold to institutions or investors that specialize in purchasing higher risk loans.

Being able to determine the collateral risk in loans can also identify particular submarkets that seem to have a significant number of high-risk loans relative to the norm, as well as those having relatively few high-risk loans. Examples of real estate submarkets are property types, i.e., condominium versus single family houses, zip codes, new construction versus resale inventory, or virtually any extractable grouping of inventory tracked by industry databases.

Identification of collateral risks alerts the lender or mortgage investor of the need to alter loan criteria or policies in a given submarket. This information can also identify whether loans or commodities in different price levels have different risk levels. This can assist the lender in modifying loan criteria depending on the price level of the commodity/asset in question or more accurately price a portfolio of pooled loans sold in the secondary loan market. There are numerous other benefits and uses that can be made of knowing the risk to lenders or eventual investors in securitized collateralized loans.

SUMMARY OF THE INVENTION

In accordance with the present invention, a collateral risk index reflective of the current risk to a lender of each of the collateral loans in its portfolio can be determined. The collateral risk index is based on the supply and demand of the collateral in the relevant submarket, as well as the loan balance in proportion to the value of the collateral/asset. The method includes the gathering of sales figures for the part of the market in question over a specified period. The data acquired for a given period includes: all sales which have closed in that period, $S_c$; pending sales at the end of that period, $S_p$; listings of offerings for commodities/assets which have expired or were withdrawn, canceled, unsuccessfully marketed, or otherwise taken off the market for any reason other than a sale during that period, $L_e$; actively offered commodities/asset listings at the point in time at which the data sample is obtained, $L_a$; for each loan, the value of the commodity/asset, V; and the balance owed on the loan, B. By summing together all closed sales, $S_c$, all pending sales, $S_p$, and expired listings, $L_e$, a total number of commodities/assets listed/offered, exposed to the market, then removed for any reason, whatsoever, whether it be sale, expiration, withdrawal, etc., $T_l$. Similarly, by summing all closed sales, $S_c$, with all pending sales, $S_p$, a total of all those successfully marketed commodities/assets is available, $T_s$. A demand index, D, is derived as the ratio of successfully marketed properties, $T_s$, over total listed properties, $T_l$. The lower the ratio, the lower the demand. The higher the ratio, the higher the demand. Similarly, a rate of absorption, $R_a$, is obtained by dividing the successfully marketed commodities, $T_s$, by the number of days in the period, $P_d$. A supply level, $S_l$, is derived from the ratio of total active listing/offerings, $L_a$, by the rate of absorption, $R_a$. Next, a market index, $M_i$, is obtained by dividing the demand index by the supply level. For purposes of readability, a multiplier of 10,000 (or 100,000) is applied to the "raw" market index.

Next, the proportion of the loan balance to the commodity value, P, is determined by dividing the loan balance, B, by the commodity value, V, for a specific loan in the loan portfolio. Lastly, the collateral risk index, CRi, is obtained by dividing the market index, $M_i$, by the loan proportion, P. This provides an index of the risk of a particular loan for a commodity to the lender.

Note that supply is measured in terms of time, i.e., based upon the rate of absorption calculated. There is a certain number of days of supply. Thus, supply reflects not the number of listings, but the amount of time that the current listing inventory will take to be absorbed by the market based upon the historical rate of absorption of the data sample under study.

In accordance with further aspects of the present invention, the Collateral Risk Index, $CR_i$ may be determined and charted for any or all of the collateral/asset loans in the lender's/investor's portfolio.

Further features and advantages of the invention will become apparent during the course of the following description in which reference is made to the accompanying drawings, and which is provided purely by way of nonrestrictive example.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
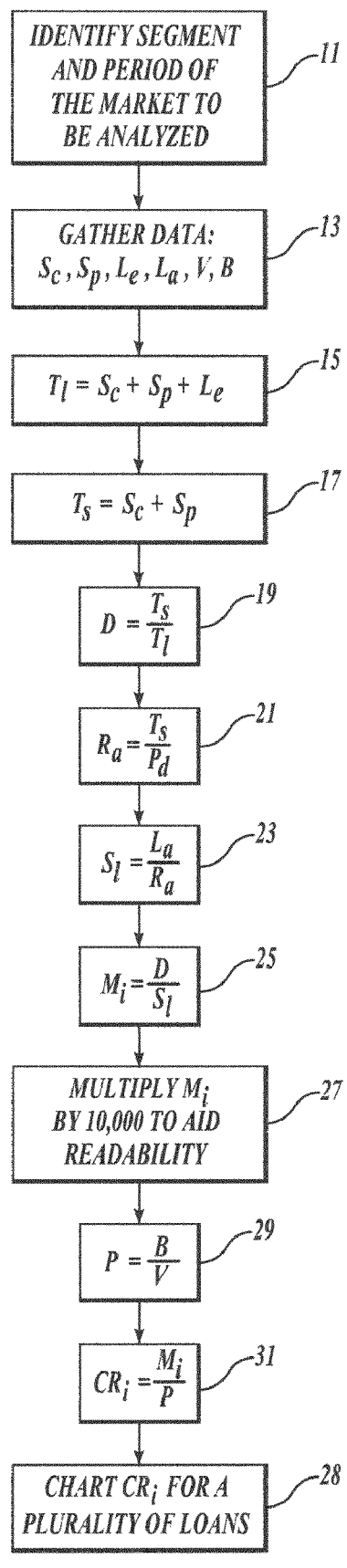
FIG. 1 is a flow diagram of the method of the present invention.

With reference to FIG. 1, at box 11, a segment of a commodity/asset market to be analyzed is identified. Such commodities/assets can be real estate, boats, airplanes, automobiles, and expensive leased equipment, such as medical and manufacturing equipment, or other relatively expensive tangible or intangible items. In this regard, a market segment can be defined either geographically, such as a country, region, state, county, or city. If the commodity/asset being analyzed is residential real estate, the market segment may be a zip code area or a neighborhood.

The market segment may be analyzed by a subtype of the commodity. For example, for airplanes, the market subsegment may be propeller planes or jet planes, or even private jets versus commercial passenger jets or cargo jets. For boats or ships, the market subsegment might be private yachts over 50 feet in length or commercial fishing boats or cargo ships. If the commodity is residential property, the analysis may be by type such as new home construction, condominiums, waterfront homes, multi-family dwellings, etc., or, for commercial property type, the analysis may be by retail stores, industrial plants, warehouses, etc. The only prerequisite for choosing a segment is the availability of data regarding sales and listing activity.

At box 11, a time period is chosen, over which the analysis is to be accomplished. The period can be defined as the length of time over which sales activity is to be measured; the period may be chosen to be any length of time. The compilation period can be one year to accommodate seasonal variations with the market index $M_i$ calculated each month based on data gathered over the past twelve months. The time period between calculation of $M_i$ may be longer. Alternatively, if desired, for instance during market volatility, compilations may be made more frequently, for example semiannually, biweekly, weekly or even daily.

The raw data required for the method of the present invention can normally be obtained from various sources. For example, for airplanes or boats, the data can be obtained from brokers or trade associations. For real estate, the data can be obtained from a real estate broker's multiple-listing service (MLS) or a realtor's association and the county records. Most geographical regions of the United States have an MLS which tracks and compiles information regarding the real estate market of the area. Information regarding the sales of property and active property listings are typically maintained as part of a database. The data required can be extracted without difficulty from the MLS database using the appropriate computer search. In particular, a personal computer with a central processing unit and random access memory (RAM) may be used to interface with the MLS database in order to extract the desired data. Also, from the county tax records, it is possible to ascertain the assessed value of the real estate as well as the mortgage amount. After the segment of the market and time period have been identified, at box 13, the relevant data for the segment to be analyzed is gathered. Specifically, the six data variables gathered are: (1) all completed and closed commodity sales during the period, e.g., during the last twelve months, $S_c$; (2) all commodity sales still pending (for example, not yet completed escrow) at the end of the period, $S_p$; (3) all commodities on the market which have not sold and where the original listing agreement between the broker and the seller has expired (known in the real estate art as "expired listings") during the period, e.g., during the last twelve months, $L_e$ (alternatively, the listings canceled and listings withdrawn may be added to the listings expired); (4) total number of commodities which are still active at the end of the period, $L_a$; (5) the value of the particular commodity, V; and (6) the balance of the outstanding loan or mortgage, B, for the commodity in question.

By way of further explanation, assume that the period chosen is one year, i.e., 365 days. Then, $S_c$ would be defined to be the number of sales in a segment which were completed and closed during that one-year period. Similarly, $L_e$ is defined to be the total number of commodity listings which have expired during that one-year period. With respect to the number of pending sales, $S_p$, this figure is the total number of sales in which an earnest money or down payment agreement has been executed but the transaction has not yet completed the escrow process. Also, $L_a$ is the total number of commodities that are active listings, i.e., those listings currently available at the time the data sample is taken.

At box 15, the sum of $S_c$, $S_p$, and $L_e$ is obtained to provide a measure of the total number of listings which came to and left the market during the period, $T_l$. Similarly, at box 17, the sum of $S_c$ and $S_p$ is determined to find the total number of commodities successfully marketed, $T_s$. From these figures, at box 19, a demand index, D, may be found as the ratio of $T_s$ divided by $T_l$.

A useful tool for measuring the absorption rate of properties in the commodity market may be obtained by dividing the commodities successfully marketed, $T_s$, by the number of days, $P_d$, in the chosen period. This gives a rate of absorption, $R_a$, in commodities per day, which is calculated at box 21. From this rate of absorption, $R_a$, a supply level in terms of days, $S_l$, is determined at box 23 by dividing the total number of active listings, $L_a$, by $R_a$.

At box 25, a market index, $M_i$, which is an indicator for the specific period analyzed of the strength of the segment, is calculated by dividing the demand index, D, by the supply level, $S_l$. Typically $M_i$ is on the order of a few hundredths of a point; therefore, to aid in the readability of the market index, $M_i$ at box 27, $M_i$ is multiplied by a factor of 10,000 or 100,000. It can be appreciated, however, that this step is not required.

At box 29, the proportion P of the value of the collateral, V, represented by the loan balance, B, is determined. Then the collateral risk index, CRi, is determined by dividing the market index $M_i$ by the loan proportion P. This provides a risk to the lender for a specific collateral item taking into consideration all of the foregoing factors, including the supply and demand of the collateral and the amount owed the lender in proportion to the value of the collateral. This enables the lender to evaluate risk of loss well in advance of when the loss might occur.

Although the description of the preferred embodiment details the calculation of the Collateral Risk Index, $CR_i$, as a plurality of individual calculations using the available sales data, it will be appreciated by those skilled in the art that the Collateral Risk Index, $CR_i$, may be equivalently stated as:

$$CR_i = \frac{V(S_p + Sc)^2}{BP_d L_a(S_c + S_p + L_e)}$$

Thus, whether the Collateral Risk Index is determined by following the description of the preferred embodiment as referenced to FIG. 1, or by the equivalent equation shown above, the resulting Collateral Risk Index, $CR_i$, is identical.

Figure 2:
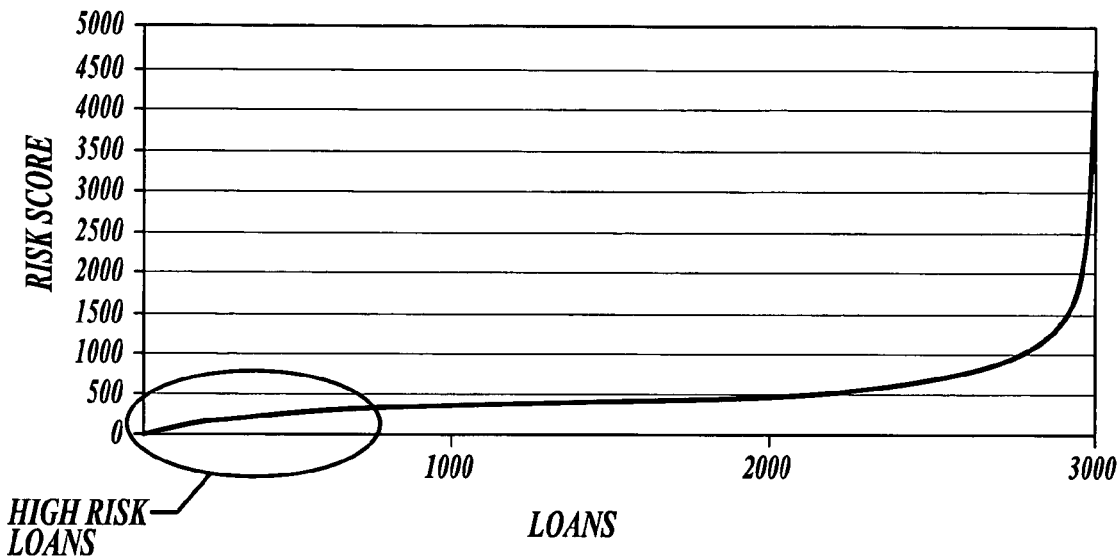
FIG. 2 is a chart of the collateral risk index for loans in a lender's portfolio.
Figure 3:
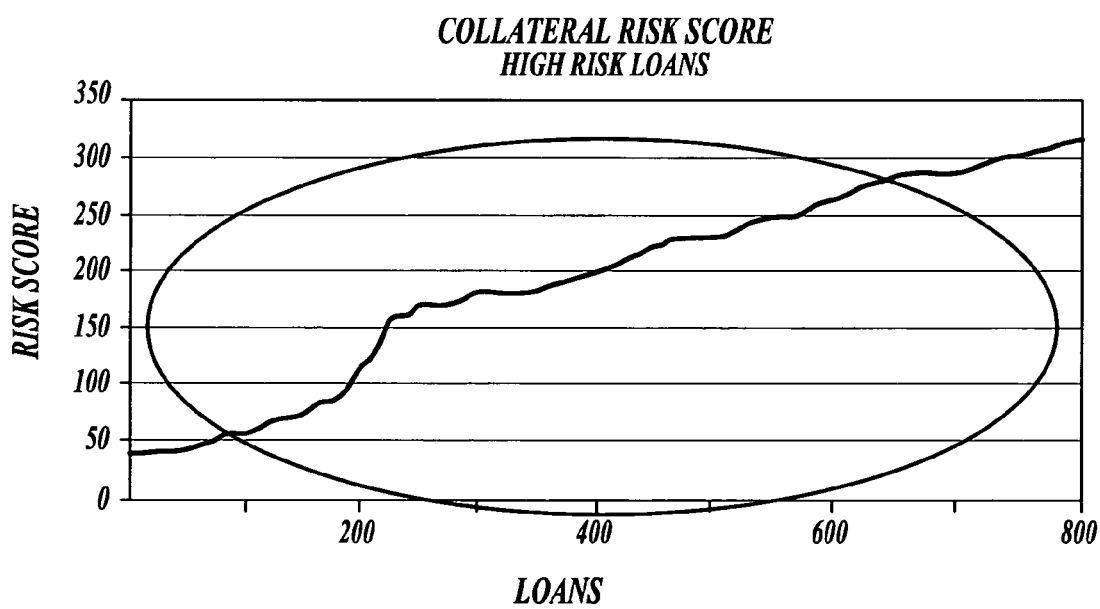
FIG. 3 is a chart, in enlarged scale, of the highest risk loans shown in FIG. 2.

The Collateral Risk Index, $CR_i$, calculated using the foregoing method for several thousand individual loans is plotted in FIG. 2 on a standard X-Y grid. The X-axis represents individual loans, and the Y-axis represents the Collateral Risk Index. The loans with the lowest Collateral Risk Index represent the highest risk of loss to the lender. It can be seen that most of the loans have a Collateral Risk Index score of from 300-500. The lowest quartile of the loan data plotted in FIG. 2 is shown in FIG. 3, wherein the Collateral Risk Index in the Y scale is enlarged. FIG. 3 illustrates those loans in the lender's portfolio that represent the highest risk to the lender. These loans can be given appropriate attention to reduce the possibility of losses occurring from these loans.

To provide an example of the foregoing method, the Collateral Risk Index corresponding to one of the loans shown in FIG. 2 will be calculated. As of Oct. 1, 2003, the following data for the prior 12 months of a commodity market segment existed:

(1) All completed and closed commodity sales during the 12-month data sample period, $S_c$: 370;

(2) All commodity sales pending as of October 1, $S_p$: 37;

(3) Expired listings during the 12-month period, $L_e$: 350;

(4) Total number of commodities for sale as of October 1, $L_a$: 189;

(5) Value of collateral, V: 605,000; and (6) Balance of loans, B: 747,000.

As depicted in box 15 of FIG. 1, the number of sold, pending and expired (including withdrawn, canceled or any type of removal from the market prior to sale) listings/offerings ($S_c$, $S_p$, and $L_e$) is summed to obtain a measure of the total listings/offerings on the market during the past 12 months, $T_l$.

|       |                 |
|-------|-----------------|
| $S_c$ | 370 Commodities |
| $S_p$ | 37              |
| $L_e$ | 350             |
| $T_l$ | 757             |

In a next step depicted in box 17 of FIG. 1 and set forth below, the total number of sold and pending transactions are added together to give a representation of the number of commodities successfully marketed over the past 12 months, Ts:

|       |     |
|-------|-----|
| $S_c$ | 370 |
| $S_p$ | 37  |
| $T_s$ | 407 |

Next, as depicted in box 9 shown in FIG. 1, the summation $T_s$, is divided by the summation $T_l$ provides a ratio that reflects a percentage of commodities that were listed and successfully marketed during the past 12 months. This is a reflection of demand. In the present sample, as set forth below, about 54% of the listings/offerings that came on the market over the past 12 months were sold while 46% expired.

$$\text{Demand}, D = T_s/T_l$$
$$= 407/757$$
$$= 0.538$$

The average number of sales per day is next calculated. This provides a rate of absorption, $R_a$, of the properties on a daily basis.

$$\text{Rate of absorption}, R_a = T_s/365$$
$$= 407/365$$
$$= 1.12 \text{ commodities per day}$$

From the rate of absorption, $R_a$, a supply level in terms of days, $S_l$, is determined by dividing the total number of active listings, $L_a$ by $R_a$.

$$\text{Supply}, S_l = L_a/R_a$$
$$= 189/1.12$$
$$= 168 \text{ days of supply}$$

As depicted in box 25 of FIG. 1, the market index, $M_i$ is calculated by dividing the demand index, D, by the supply level, $S_l$. As shown by the following calculation, the market index as of Oct. 1, 2003, was 0.0262. This number is typically multiplied by 100,000, see box 27, to provide a more easily readable graph number, i.e., 262.

$$M_i \times 10,000 = D/S_l(100,000)$$
$$= 0.538/168 \times 100,000$$
$$= 0.0032 \times 100,000$$
$$= 320$$

As depicted in box 29, for a particular collateral/asset loan, the proportion of the loan relative to the value of the collateral is calculated by dividing the loan balance, B, by the value of the collateral, V.

$$P = B/V$$
$$= 747,000/650,000$$
$$= 1.23$$

As depicted in box 31 of FIG. 1, the Collateral Risk Index, $CR_i$, is calculated by dividing the market index, $M_i$, by the loan proportion "P." As shown in the following calculation, the Collateral Risk Index shows the specific collateral/asset in question is 260, which is within the bottom quartile of those collateral loans plotted in FIGS. 2 and 3.

$$CR_i = M_i/P$$
$$= 320/1.23$$
$$= 260$$

Similar calculations are made for other collateral/asset loans in the lender's portfolio. The Collateral Risk Indices thereby calculated may be plotted in the manner of FIGS. 2 and 3, discussed above. These plots give a visual representation of the Collateral Risk Index of all of the collateral loans in the lender's portfolio. Also, it is to be understood that the foregoing calculations can be carried out in essentially one step by using Equation (1), set forth above.

There are segments in any commodity market that will create greater and lesser risks to those bearing the financial burden of collateral loans. These differences can be based on subsegments of the commodities market, for example, in a specific county or region of a county. This information can be calculated using the present invention and then used by lenders/investors to determine whether to take action on high-risk loans.

By taking into consideration the supply and demand for the commodity, the present invention enables lenders and investors to "forecast" which loans may become problems well in advance of when the loss to the lender/investor actually occurs. Also, the lender/investor can ascertain what loans are more likely to lead to loss if a trigger event occurs, such as major family trauma, for example, a death, divorce, catastrophic health problem, or loss of job, regardless of the borrowers prior credit history or how high the borrower's credit score is.

Figure 4:
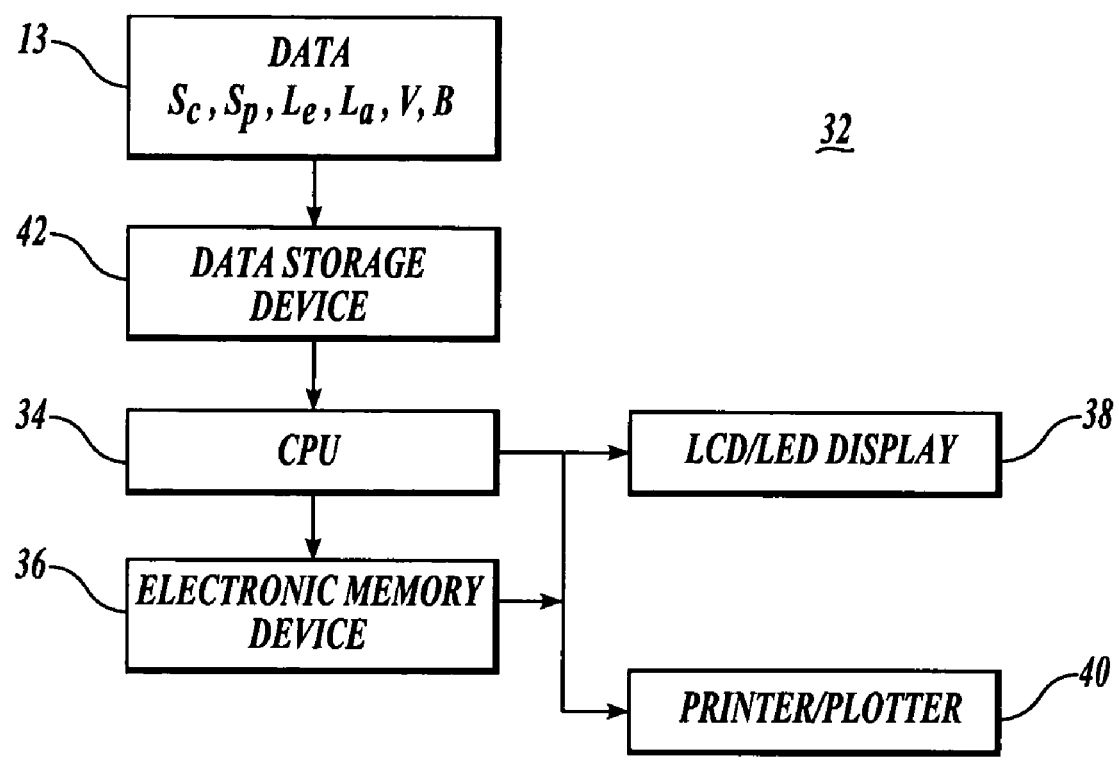
FIG. 4 is a schematic diagram of an apparatus used in conjunction with the present invention.

Further, as shown in FIG. 4, to facilitate determining the market indices, $M_i$, a commercially available calculator or computer 32 having a central processing unit 34 may be used, and the resulting calculations stored in an electronic memory device 36, for instance on a floppy disk, "hard disk," punch tape or cards, all of which are standard articles of commerce. The resulting calculations may be displayed on a visual output device 38, such as a commercially available LCD or LED display or printed or plotted on paper with a commercially available printer/plotter 40. Moreover, the data used in determining $M_i$ may be also stored in an electronic memory device 42 of the types discussed above.

In the foregoing example, the data collected over a twelve-month period was utilized. Using this time interval has the advantage of possibly averaging out variations of commodity sales and/or listings/offerings based on normal seasonal fluctuations. However, the compilation time period can be over a different length of time as long as sufficient data is available to provide realistic values for the data variables used to calculate the collateral risk index and the other indices of the present invention. For example, it may be desirable to utilize the intervals of six months or even one month, especially if it is desirable to take seasonal variations into consideration or if the market being analyzed changes very quickly.

While a preferred embodiment of the invention has been illustrated and described, it will be appreciated that various changes can be made therein without departing from the spirit and scope of the invention. Thus, within the scope of the appended claims, it is to be understood that the invention can be practiced otherwise than as specifically described herein.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of determining a collateral risk index for a collateral loan made on a commodity, executed on a computing means having a central processing unit, the method comprising the steps of:
    (a) using said computing means to gather from one or more data sources a total number of closed sales, $S_c$, in a particular commodity market in a predetermined period of time;
    (b) using said computing means to gather from one or more data sources a total number of sales which are pending, $S_p$, in said particular commodity market in said predetermined period of time;
    (c) using said computing means to gather from one or more data sources a total number of expired listings, $L_e$, in said particular commodity market in said predetermined period of time;
    (d) using said computing means to gather from one or more data sources a total number of active listings $L_a$, in said particular commodity market in said predetermined period of time;
    (e) determining, by said computing means, a market index, $M_i$, indicative of the strength of said particular commodity market over a period consisting of a length of days, $P_d$, in accordance with $$M_i = \frac{(S_p + S_c)^2}{P_d L_a (S_c + S_p + L_e)};$$

(f) determining a ratio P of a loan balance, B, to a value of the commodity, V, wherein the loan balance, B and the value of the commodity, V are identified from the collateral loan;
    (g) determining a collateral risk index, $CR_i$ by dividing the market index, $M_i$, by the loan balance ratio, P; and
    (h) determining if action is required on the collateral loan based on the Collateral Risk Index to reduce a risk of loss, and if it is determined that action is required, determining a specific action for the collateral loan wherein a specific action is at least one action in a group of actions comprising monitoring the loan for signs of a default or selling the loan to a third party.

2. The method of claim 1, including the step of repeating steps (a) through (h) for a plurality of loans, and graphically representing the calculated collateral risk index.

3. The method of claim 2, wherein the commodity is composed of real estate and said data sources are a multi-listing service (MLS) database.

4. The method of claim 2, wherein the commodity is composed of boats.

5. The method of claim 2, wherein the commodity is composed of airplanes.

6. The method of claim 2, wherein the commodity is composed of medical equipment.

7. The method of claim 2, wherein the commodity is composed of manufacturing equipment.

8. The method of claim 2, wherein the commodity is composed of automobiles.

9. A method of determining a risk of loss on loans for commodities in a lender's or investor's portfolio, executed on a computing means having a central processing unit, the method comprising the steps of:
    (a) using said computing means to gather from data sources: the total number of closed sales in a predetermined period of time, $S_c$; the number of sales pending in said predetermined period of time, $S_p$; the number of listings which have expired in said predetermined period of time, $L_e$; the number of commodities actively listed, $L_a$, at the end of said predetermined period of time; the balance due on a particular loan; and the value of the commodity for such loan;
    (b) calculating, a total number of listed commodities in said particular commodity market, $T_l$, in accordance with the equation: $T_l = S_c + S_p + L_e$;
    (c) determining a total number of successfully marketed commodities, $T_s$ in accordance with the equation: $T_s = S_c + S_p$;
    (d) determining a demand index, D, as being $T_s$ divided by $T_l$;
    (e) calculating a rate of absorption, $R_a$, as being $T_s$ divided by a length of days, $P_d$ to be monitored;
    (f) calculating a supply level, $S_l$, as a ratio of $L_a$ divided by $R_a$;
    (g) calculating, by said computing means, a market index $M_i$ indicative of the strength of the particular commodity market over $P_d$, as the ratio of D divided by $S_l$;
    (h) for a specific loan, calculating a ratio, P, of a value of the commodity, V, represented by a loan balance, B;
    (i) calculating a collateral risk index CRi by dividing the market index $M_i$ by the ratio, P; and
    (j) evaluating if any remedial action to reduce the risk of loss is required with respect to specific commodity loans in the collateral risk index and if it is determined that remedial action is required, determining a specific remedial action for the collateral loans wherein the specific remedial action is at least one action in a group of actions comprising monitoring the loan for signs of a default or selling the loan to a third party.

10. The method of claim 8, including the step of repeating steps (a) through (i) for a plurality of said predetermined periods, and graphically representing the calculated collateral risk index.

11. The method of claim 8, wherein the commodity is selected from a group consisting of real estate, boats, airplanes, automobiles, medical equipment, and manufacturing equipment.

12. An apparatus for calculating a collateral risk index, $CR_i$, determinative of a risk of loss with respect to a loan for a commodity, comprising:
    (a) means for interfacing with one or more databases to gather: the total number of closed sales, $S_c$, in a commodity market in predetermined period of time; the total number of sales which are pending, $S_p$, in said market in said predetermined period of time; the total number of expired listings, $L_e$, in said market in said period of time; the total number of active listings, $L_a$, in said market in said predetermined period of time; the balance, B, due on a specific loan; and, the value, V, of the commodity corresponding to the specific loan;
    (b) computing means receiving from said means for interfacing said $S_c$, $S_p$, $L_e$, $L_a$, B, and V parameters and calculating the collateral risk index determinative of the risk of loss, $CR_i$, said collateral risk index, $CR_i$, taking into account the strength of the particular commodity market over a period of time consisting of a length of days, $P_d$ said computing means calculating said collateral risk index, $CR_i$, in accordance with $$CR_i = \frac{V(S_p + Sc)^2}{BP_d L_a (S_c + S_p + L_e)}.$$

13. The apparatus of claim 12, wherein the commodity is selected from the group consisting of real estate, boats, airplanes, medical equipment, and manufacturing equipment.

* * * * *

UNITED STATES PATENT AND TRADEMARK OFFICE
CERTIFICATE OF CORRECTION

PATENT NO. : 7,707,102 B2  
APPLICATION NO. : 10/973951  
DATED : April 27, 2010  
INVENTOR(S) : R. E. Rothstein Page 1 of 1

It is certified that error appears in the above-identified patent and that said Letters Patent is hereby corrected as shown below:

| COLUMN | LINE | |
|---|---|---|
| (54) | Title Line 3 | after "ANALYSIS" insert --FOR-- |
| (74) | Attorney, Agent, or Firm | after "Kindness" insert --PLLC-- |
| 1 | 3 | after "ANALYSIS" insert --FOR-- |
| 9 (Claim 9, | 24 line 14) | after "(b) calculating" delete "," |
| 9 (Claim 9, | 41 line 31) | "CRi" should read --$CR_i$-- |
| 10 (Claim 12, | 33 line 20) | after "$P_d$" insert --,-- |
| 10 Claim 12, | 35 line 22) (Equation) | " $CR_i = \dfrac{V(S_p + Sc)^2}{BP_d L_a (S_c + S_p + L_e)}$ " | should read $$-- CR_i = \dfrac{V(S_p + S_c)^2}{BP_d L_a (S_c + S_p + L_e)} \; --$$

Signed and Sealed this

Thirtieth Day of November, 2010

David J. Kappos  
*Director of the United States Patent and Trademark Office*